(12) United States Patent
Zheng et al.

(10) Patent No.: US 10,715,833 B2
(45) Date of Patent: Jul. 14, 2020

(54) ADAPTIVE SYNTAX GROUPING AND COMPRESSION IN VIDEO DATA USING A DEFAULT VALUE AND AN EXCEPTION VALUE

(71) Applicant: Apple Inc., Cupertino, CA (US)

(72) Inventors: Yunfei Zheng, Curpertino, CA (US);
Dazhong Zhang, Milpitas, CA (US);
Xiaosong Zhou, Campbell, CA (US);
Chris Y. Chung, Sunnyvale, CA (US);
Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 438 days.

(21) Appl. No.: 14/289,082

(22) Filed: May 28, 2014

(65) Prior Publication Data
US 2015/0350646 A1    Dec. 3, 2015

(51) Int. Cl.
*H04N 19/70* (2014.01)

(52) U.S. Cl.
CPC .................................. *H04N 19/70* (2014.11)

(58) Field of Classification Search
CPC .... H04N 19/70; H04N 19/115; H04N 19/157; H04N 19/176; H04N 19/44; H04N 19/96
See application file for complete search history.

(56) References Cited

U.S. PATENT DOCUMENTS

| | | | | |
|---|---|---|---|---|
| 5,966,561 A | * | 10/1999 | Yamaguchi | G03G 15/0152 399/302 |
| 6,092,041 A | * | 7/2000 | Pan | G10L 19/24 704/229 |
| 6,687,384 B1 | * | 2/2004 | Isnardi | H04N 21/23892 375/E7.018 |
| 2002/0036990 A1 | * | 3/2002 | Chodor | H04L 12/2854 370/262 |
| 2002/0176433 A1 | * | 11/2002 | Zhu | H04L 49/357 370/422 |
| 2004/0066466 A1 | * | 4/2004 | MacInnis | H04N 7/012 348/451 |
| 2005/0002460 A1 | * | 1/2005 | Ramakrishnan | H04N 19/61 375/240.25 |
| 2005/0012648 A1 | * | 1/2005 | Marpe | H03M 7/4006 341/107 |
| 2005/0123056 A1 | * | 6/2005 | Wang | H04N 19/70 375/240.25 |
| 2007/0050149 A1 | * | 3/2007 | Raskin | G06Q 30/02 702/19 |
| 2007/0140331 A1 | * | 6/2007 | Dufour | H04N 19/105 375/240.1 |

(Continued)

FOREIGN PATENT DOCUMENTS

EP    2391133 A1    11/2011

*Primary Examiner* — Joseph Suh
(74) *Attorney, Agent, or Firm* — BakerHostetler

(57) ABSTRACT

An encoding system may include a video source that captures video image, a video coder, and a controller to manage operation of the system. The video coder may encode the video image into encoded video data using a plurality of subgroup parameters corresponding to a plurality of subgroups of pixels within a group. The controller may set the subgroup parameters for at least one of the subgroups of pixels in the video coder, based upon at least one parameters corresponding to the group. A decoding system may decode the video data based upon the motion prediction parameters.

26 Claims, 5 Drawing Sheets

(56) References Cited

U.S. PATENT DOCUMENTS

| | | | |
|---|---|---|---|
| 2008/0123947 A1 | 5/2008 | Moriya et al. | |
| 2009/0196517 A1* | 8/2009 | Divorra Escoda | H04N 19/176 382/240 |
| 2009/0257664 A1* | 10/2009 | Kao | H04N 19/159 382/232 |
| 2009/0304077 A1* | 12/2009 | Wu | H04N 7/5086 375/240.12 |
| 2009/0307166 A1* | 12/2009 | Routray | G06N 5/04 706/46 |
| 2010/0098199 A1* | 4/2010 | Oshikiri | G10L 19/26 375/350 |
| 2010/0191930 A1* | 7/2010 | Groff | G06F 8/44 711/170 |
| 2012/0114034 A1* | 5/2012 | Huang | H04N 19/70 375/240.03 |
| 2012/0189216 A1* | 7/2012 | Segall | G06T 5/002 382/232 |
| 2012/0195367 A1* | 8/2012 | Kossentini | H04N 19/147 375/240.02 |
| 2012/0230408 A1* | 9/2012 | Zhou | H04N 19/105 375/240.15 |
| 2012/0328025 A1* | 12/2012 | Chang | H04N 7/014 375/240.16 |
| 2013/0003830 A1* | 1/2013 | Misra | H04N 19/172 375/240.12 |
| 2013/0076746 A1* | 3/2013 | Chung | H04N 13/128 345/424 |
| 2013/0077696 A1* | 3/2013 | Zhou | H04N 19/176 375/240.24 |
| 2013/0094580 A1* | 4/2013 | Zhou | H04N 19/13 375/240.12 |
| 2013/0114712 A1* | 5/2013 | Yamamoto | H04N 19/197 375/240.12 |
| 2013/0151928 A1* | 6/2013 | Leggette | G06F 11/1076 714/763 |
| 2013/0156335 A1* | 6/2013 | Lim | H04N 19/52 382/238 |
| 2013/0188691 A1* | 7/2013 | Hague | H04N 19/159 375/240.03 |
| 2013/0197788 A1* | 8/2013 | Gebby | F02D 41/1454 701/113 |
| 2013/0204948 A1* | 8/2013 | Zeyliger | G06F 9/44505 709/206 |
| 2013/0258049 A1* | 10/2013 | Chong | H04N 19/70 348/42 |
| 2013/0272411 A1 | 10/2013 | Tu et al. | |
| 2013/0294525 A1* | 11/2013 | Norkin | H04N 19/176 375/240.24 |
| 2013/0332176 A1* | 12/2013 | Setiawan | G10L 19/00 704/500 |
| 2013/0343665 A1* | 12/2013 | Maeda | H04N 19/436 382/233 |
| 2014/0009481 A1* | 1/2014 | Butterworth | G06F 3/0484 345/581 |
| 2014/0037206 A1* | 2/2014 | Newton | H04N 19/597 382/166 |
| 2014/0044162 A1* | 2/2014 | Guo | H04N 19/52 375/240.02 |
| 2014/0064364 A1* | 3/2014 | Wang | H04N 19/80 375/240.12 |
| 2014/0079140 A1* | 3/2014 | Wang | H04N 19/197 375/240.26 |
| 2014/0177713 A1* | 6/2014 | Yuan | H04N 19/176 375/240.12 |
| 2014/0192892 A1* | 7/2014 | Van der Auwera | H04N 19/176 375/240.24 |
| 2014/0246997 A1* | 9/2014 | Suzuki | H02P 6/16 318/400.02 |
| 2014/0286406 A1* | 9/2014 | Kim | H04N 19/176 375/240.03 |
| 2014/0321532 A1* | 10/2014 | Ghat | H04N 19/40 375/240.03 |
| 2014/0348227 A1* | 11/2014 | Lee | H04N 19/91 375/240.03 |
| 2014/0355690 A1* | 12/2014 | Choi | H04N 19/176 375/240.24 |
| 2014/0362905 A1* | 12/2014 | Nguyen | H04N 19/126 375/240.03 |
| 2015/0071356 A1* | 3/2015 | Kim | H04N 19/187 375/240.16 |
| 2015/0078447 A1* | 3/2015 | Gamei | H04N 19/11 375/240.12 |
| 2015/0124877 A1* | 5/2015 | Choi | H04N 19/597 375/240.12 |
| 2015/0201190 A1* | 7/2015 | Wang | H04N 19/176 375/240.03 |
| 2015/0206177 A1* | 7/2015 | Yao | G06Q 30/0246 705/14.45 |
| 2015/0249841 A1* | 9/2015 | Yu | H04N 19/463 375/240.02 |
| 2015/0304671 A1* | 10/2015 | Deshpande | H04N 19/423 375/240.12 |
| 2015/0326886 A1* | 11/2015 | Chen | H04N 19/61 375/240.02 |
| 2015/0341638 A1* | 11/2015 | Francois | H04N 19/11 375/240.12 |
| 2015/0381980 A1* | 12/2015 | Tsuchiya | H04N 19/176 375/240.02 |
| 2016/0003035 A1* | 1/2016 | Logan | E21B 47/18 340/854.6 |
| 2016/0050422 A1* | 2/2016 | Rosewarne | H04N 19/105 375/240.12 |
| 2016/0050423 A1* | 2/2016 | Alshina | H04N 19/503 375/240.12 |
| 2016/0165233 A1* | 6/2016 | Liu | G06T 11/60 382/251 |
| 2017/0054976 A1* | 2/2017 | Li | H04N 19/82 |

\* cited by examiner

400

500

ADAPTIVE SYNTAX GROUPING AND COMPRESSION IN VIDEO DATA USING A DEFAULT VALUE AND AN EXCEPTION VALUE

BACKGROUND

In video recording, video coding may include hierarchical picture partition techniques, such as quad-tree based partitioning, which may result in better adaptation to video content. In such techniques, an image frame may be divided into many non-overlapping largest coding units (LCU's). Each LCU may be further partitioned into smaller coding units (CU's) in a quad-tree manner (each unit is divided into four smaller units). The video coder may determine the quad-tree structure of an LCU. Inside a LCU, each CU may have its own CU level syntax variables, such as skip_flag, predMode, partMode, etc. The CU's are encoded one by one with their own syntax variables. For the purpose of discussion below, a LCU may be considered a group of pixels, which includes a plurality of CU's as subgroups of pixels.

Often the video content or some specific video parameters may not vary significantly from CU to CU inside a LCU (or between some subgroups of pixels within a specific group). The CU's may share similar encoding modes and syntax, which means there could be some redundancy among the syntax. Context-adaptive binary arithmetic coding (CABAC), a form of entropy encoding, and some data compression processes may remove some of the redundancy, but may not be optimal.

Thus, there is a need to reduce the redundancy by adaptively grouping the syntax in encoded video data.

DETAILED DESCRIPTION

Figure 1:
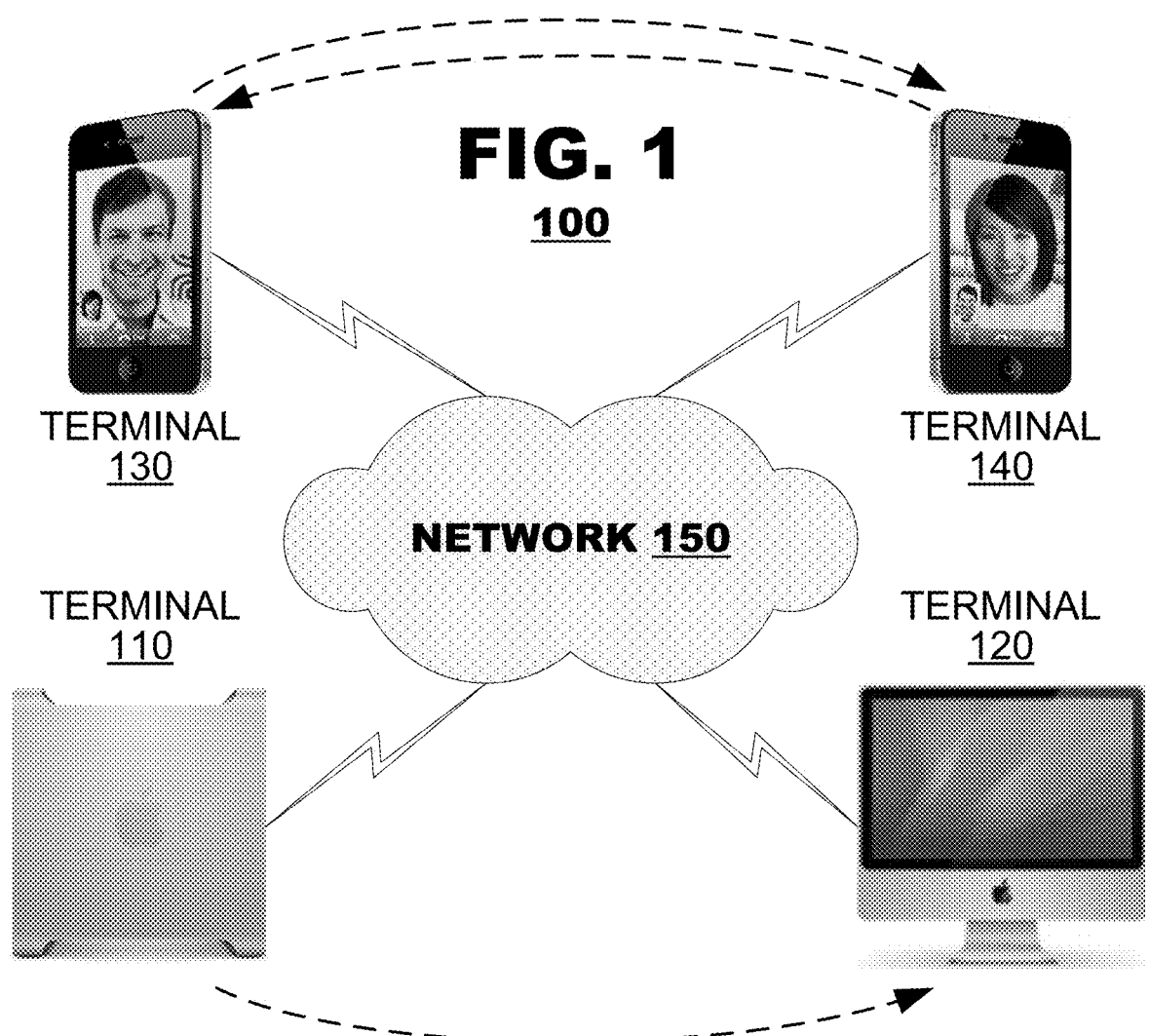
FIG. 1 illustrates a communication system according to an embodiment of the present disclosure.

FIG. 1 illustrates a simplified block diagram of a communication system 100 according to an embodiment of the present invention. The system 100 may include at least two terminals 110-120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be illustrated as servers, personal computers and smart phones but the principles of the present invention may be not so limited. Embodiments of the present invention find application with laptop computers, tablet computers, media players and/or dedicated video conferencing equipment. The network 150 represents any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 may be immaterial to the operation of the present invention unless explained herein below.

Figure 2:
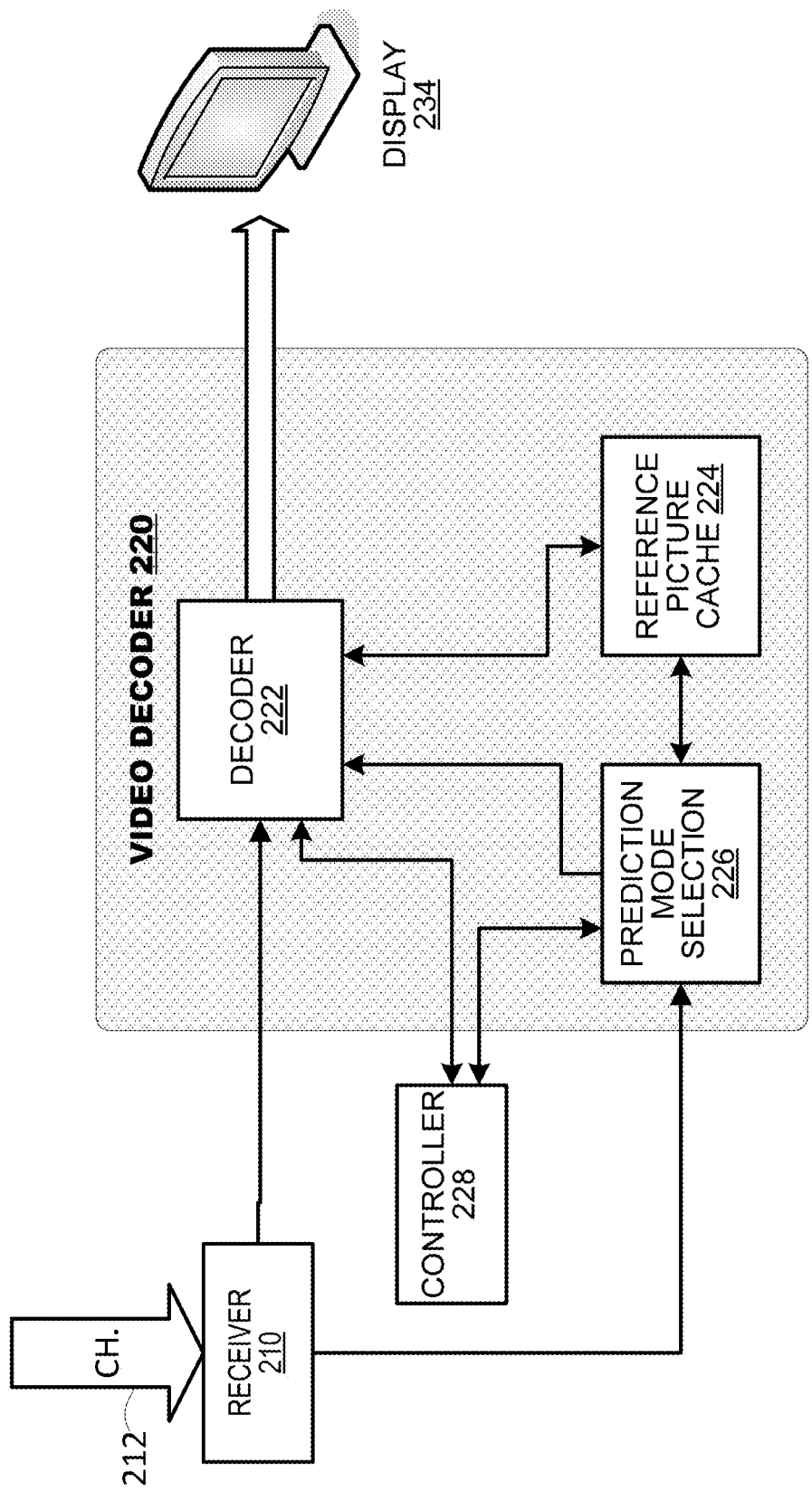
FIG. 2 illustrates a decoding system according to an embodiment of the present disclosure.

FIG. 2 may be a functional block diagram of a video decoding system 200 according to an embodiment of the present invention.

The video decoding system 200 may include a receiver 210 that receives encoded video data, a video decoder 220, a controller 228 to manage operation of the system 200 and a display 234 to display the decoded video data. The video decoder 220 may decode video sequence received. The controller 228 may set the subgroup parameters for at least one of the subgroups of pixels in the video decoder, based upon at least one parameters corresponding to the group.

The parameters and the subgroup parameters in the encoded video may include parameters for groups of pixels, where each group includes a plurality of subgroups of pixels. Additional details of the parameters and the subgroup parameters will be described below.

The receiver 210 may receive video to be decoded by the system 200. The encoded video data may be received from a channel 212, which may be a hardware/software link to a storage device which stores the encoded video data. The receiver 210 may receive the encoded video data with other data, for example, coded audio data and/or ancillary data streams. The receiver 210 may separate the encoded video data from the other data.

The video decoder 220 may perform decoding operation on the video sequence received from the receiver 210. The video decoder 220 may include a video decoder 222, a reference picture cache 224, and a prediction mode selection 226 operating under control of controller 228. The video decoder 222 may reconstruct coded video data received from the receiver 210 with reference to reference pictures stored in the reference picture cache 224. The video decoder 222 may output reconstructed video data to display 234 for display. Reconstructed video data of reference frames also may be stored to the reference picture cache 224 for use during decoding of subsequently received coded video data.

Figure 3:
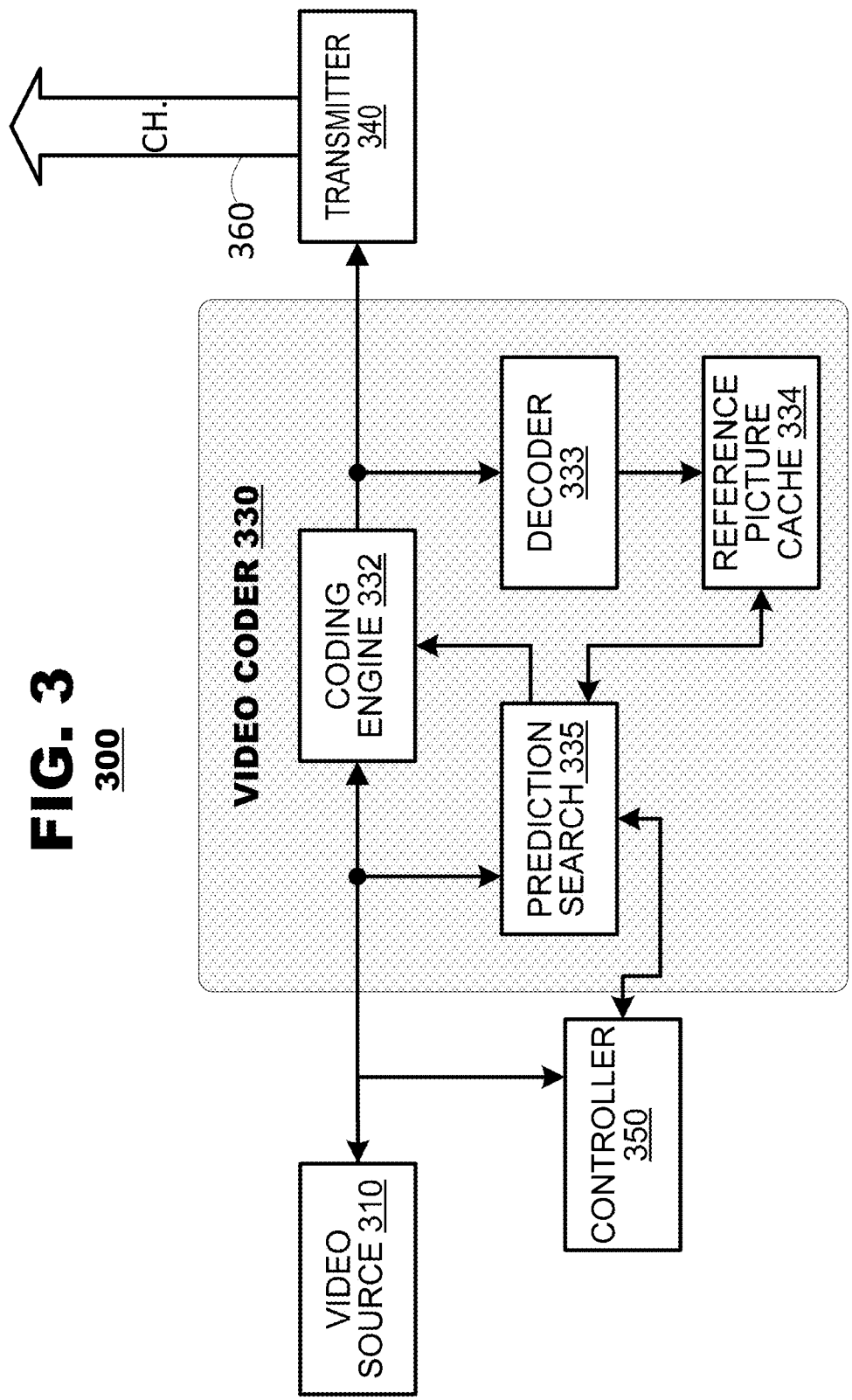
FIG. 3 illustrates a coding system according to an embodiment of the present disclosure.

The video decoder 222 may perform decoding operations that invert coding operations performed by the video coder 330 (shown in FIG. 3). The video decoder 222 may perform entropy decoding, dequantization, transform decoding, and filtering to generate recovered pixel block data. Quantization/dequantization operations may be lossy processes and, therefore, the recovered pixel block data likely will be a replica of the source pixel blocks that were coded by the video coder 330 (shown in FIG. 3) but may include some error. For pixel blocks coded predictively, the transform decoding may generate residual data; the video decoder 222 may use motion vectors associated with the pixel blocks to retrieve predicted pixel blocks from the reference picture cache 224 to be combined with the prediction residuals. The prediction mode selector 226 may identify a prediction mode being used for each pixel block of an encoded frame being decoded and request the needed data for the decoding to be read from the reference picture cache 224.

The video decoder 220 may perform decoding operations according to a predetermined protocol, such as H.263, H.264, MPEG-2, HEVC. In its operation, the video decoder 220 may perform various decoding operations, including predictive decoding operations that exploit temporal and spatial redundancies in the encoded video sequence. The coded video data, therefore, may conform to a syntax specified by the protocol being used.

The parameters may be received as part of the syntax specified by the protocol in the coded video data, or appended as ancillary portion of the coded video data, to allow for backward compatibility.

In an embodiment, the receiver 210 may receive additional data with the encoded video. The additional data may be included as part of the encoded video frames. The additional data may be used by the video decoder 220 to properly decode the data and/or to more accurately reconstruct the original video data.

FIG. 3 may be a functional block diagram of a video coding system 300 according to an embodiment of the present invention.

The system 300 may include a video source 310 that captures video image to be coded by the system 300, a video coder 330, a transmitter 340, and a controller 350 to manage operation of the system 300. The video coder 330 may encode the video image into encoded video data using a plurality of subgroup parameters corresponding to a plurality of subgroups of pixels within a group. The controller 350 may set the subgroup parameters for at least one of the subgroups of pixels in the video coder, based upon at least one parameters corresponding to the group. The transmitter 340 may transmit the video data.

The video source 310 may provide video to be coded by the system 300. In a media serving system, the video source 310 may be a storage device storing previously prepared video. In a videoconferencing system, the video source 310 may be a camera that captures local image information as a video sequence. Video data typically may be provided as a plurality of individual frames that impart motion when viewed in sequence. The frames themselves typically may be organized as a spatial array of pixels.

According to an embodiment, the system 300 may code and compress the image information for frames of the video sequence in real time, based upon one or more parameters. The controller 350 may control the compression and coding in video coder 330, based on the parameters.

As part of its operation, the video coder 330 may perform motion compensated predictive coding, which codes an input frame predictively with reference to one or more previously-coded frames from the video sequence that were designated as "reference frames." In this manner, the coding engine 332 codes differences between pixel blocks of an input frame and pixel blocks of reference frame(s) that may be selected as prediction reference(s) to the input frame.

The local video decoder 333 may decode coded video data of frames that may be designated as reference frames. Operations of the coding engine 332 typically may be lossy processes. When the coded video data may be decoded at a video decoder (not shown in FIG. 3), the recovered video sequence typically may be a replica of the source video sequence with some errors. The local video decoder 333 replicates decoding processes that will be performed by the video decoder on reference frames and may cause reconstructed reference frames to be stored in the reference picture cache 334. In this manner, the system 300 may store copies of reconstructed reference frames locally that have common content as the reconstructed reference frames that will be obtained by a far-end video decoder (absent transmission errors).

The predictor 335 may perform prediction searches for the coding engine 332. That is, for a new frame to be coded, the predictor 335 may search the reference picture cache 334 for image data (as candidate reference pixel blocks) that may serve as an appropriate prediction reference for the new frames. The predictor 335 may operate on a pixel block-by-pixel block basis to find appropriate prediction references. In some cases, as determined by search results obtained by the predictor 335, an input frame may have prediction references drawn from multiple frames stored in the reference picture cache 334.

The controller 350 may manage coding operations of the video coder 330, including, for example, setting of parameters and subgroup parameters used for encoding the video data.

The transmitter 340 may buffer coded video data to prepare it for transmission via a communication channel 360, which may be a hardware/software link to a storage device which would store the encoded video data. The transmitter 340 may merge coded video data from the video coder 330 with other data to be transmitted, for example, coded audio data and/or ancillary data streams (sources not shown).

The controller 350 may manage operation of the system 300. During coding, the controller 350 may assign to each frame a certain frame type (either of its own accord or in cooperation with the controller 350), which may affect the coding techniques that may be applied to the respective frame. For example, frames often may be assigned as one of the following frame types:

An Intra Frame (I frame) may be one that may be coded and decoded without using any other frame in the sequence as a source of prediction.

A Predictive Frame (P frame) may be one that may be coded and decoded using intra prediction or inter prediction using at most one motion vector and reference index to predict the sample values of each block.

A Bi-directionally Predictive Frame (B frame) may be one that may be coded and decoded using intra prediction or inter prediction using at most two motion vectors and reference indices to predict the sample values of each block.

Frames commonly may be parsed spatially into a plurality of pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frames. For example, pixel blocks of I frames may be coded non-predictively or they may be coded predictively with reference to pixel blocks of the same frame (spatial prediction). Pixel blocks of P frames may be coded non-predictively, via spatial prediction or via temporal prediction with reference to one previously coded reference frame. Pixel blocks of B frames may be coded non-predictively, via spatial prediction or via temporal prediction with reference to one or two previously coded reference frames.

The video coder 330 may perform coding operations according to a predetermined protocol, such as H.263, H.264, MPEG-2, HEVC. In its operation, the video coder 330 may perform various compression operations, including predictive coding operations that exploit temporal and spatial redundancies in the input video sequence. The coded video data, therefore, may conform to a syntax specified by the protocol being used.

In an embodiment, the transmitter 340 may transmit additional data with the encoded video. The video coder 330 may include such data as part of the encoded video frames.

In an embodiment according the invention, syntax of video data may be grouped and set by the controller 350 in video coder 330 to reduce redundancy.

The syntax predMode is used as an illustrative example here. Similar methods of implementation may be used for other video data syntax. PredMode of a CU is a flag that indicates whether a CU is encoded with inter mode or intra mode. Each non-skip CU may expect to be encoded with a predMode value to indicate whether the CU will be predicted by inter or intra mode, and then related syntax may provide additional data for the prediction of the CU. In many cases, there is no intra mode inside any of the CU's in an entire LCU. In such a case, the predMode syntax for all the CU's in a LCU may be compressed by signaling a flag at the LCU level to indicate that it is an all inter-mode LCU. Then there would be no need to encode the predMode syntax for each individual CU inside a specific LCU.

In an example coding unit semantics, "all_inter_flag" may be coded for a LCU (or a group of pixels with multiple sub-groups). "all_inter_flag"=1 specifies that the current LCU includes CU's all predicted in inter mode, which means individual CU's in the current LCU no longer need their own predMode syntax. "all_inter_flag"=0 specifies that the current LCU includes CU's predicted in either intra or inter modes. If "all_inter_flag"=0, then individual CU's inside the current LCU may be further coded with their own predMode syntax. See the semantics below:

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   ... | |
|   all_inter_flag[ x0 ][ y0 ] | ae(v) |
|   coding_quadtree( xCtb, yCtb, CtbLog2SizeY, 0, all_inter_flag ) | |
| ... | |
| coding_quadtree( x0, y0, log2CbSize,{ | |
| cqtDepth ,all_inter_flag ) | |
| ... | |
|   Coding_unit(x0, y0, log2CbSize, all_inter_flag) | |
| ... | |
| coding_unit( x0, y0, log2CbSize, all_inter_flag ) { | |
|   ... | |
|   if( slice_type != I & !all_inter_flag ) | |
|     pred_mode_flag | ae(v) |
|   ... | |

Thus, significant number of bits may be saved in the encoded video data, which would reduce bandwidth during video data transmission and reduce storage space for the video file.

Similarly, other encoding syntax and parameters may have redundancy reduced by similar implementation, saving even more bits. For example, Partition mode, skip mode, SAO parameters, residue flags, transform split, transform depth, etc. Additionally, more than one syntax can be grouped together with sharing the same signaling information at LCU level. For example, predMode and partMode can be grouped together.

Additionally, while the above example illustrates the case in coding CU's and LCU's, other groupings of pixels comprising subgroups of pixels may implement similar methods in their syntax to reduce redundancy. For example, slice headers, SPS, PPS, region of interest (ROI), etc.

The above example illustrates a syntax grouping that uses a "signaled default signaled exception" method. That is, the syntax signals a default setting of 1 for "all_inter_flag" for CU's within a LCU, and also signals an exception setting where CU's for a particular LCU are not all inter mode. However, many other possible methods for syntax grouping are possible.

In an embodiment, a syntax grouping may use an "assumed default signaled exception" method. In this method, for example, the syntax may assume that all CU's are by default in inter 2N×2N partition mode, and only signals partMode syntax for a CU if the CU is predicted in other partition modes (2N×N, N×2N, or N×N). By this way, the syntax at LCU (e.g. all 2N×2N flag) does not even need to be used, saving even more bits.

In an embodiment, a syntax grouping may use a "signaled baseline signaled change" method, for more complex variables such as a numeric parameter (for example color values, coefficients). A numeric parameter in coding may have some baseline or average value from which individual CU's may deviate only slightly from. In such a case, the LCU may be signaled by syntax for the baseline value of that numeric parameter, and individual CU's may be signaled by syntax for amount of deviation from the baseline value. If the deviations are small enough, the signaled deviation value may be coded with very few bits, saving significant number of bits in the encoded video data.

In an embodiment, a syntax grouping may use a "signaled change hold until next change" method, for parameters that change infrequently. In such cases, the encoded video may start with a CU (a subgroup) that has syntax of an initial value for a parameter coded as a deviation from zero value. Then, the parameter would not need to be coded again until a CU (a subgroup) has a parameter value that deviates from the previous value. In other words, the video coder and the video decoder would assume that the parameter value is held from CU to CU, unless the parameter syntax is coded otherwise for a particular CU. Once the parameter value changes for a particular CU, that new parameter value holds until the next change.

As illustrated above in the various embodiments of methods for syntax grouping, the methods can be enabled or disabled by syntax at higher levels (ex. SPS, PPS, VPS, and/or slice header), by for example, including in the syntax of the higher levels, a control parameter that indicates whether all of the plurality of the subgroup parameters within the group are encoded in the encoded video data, or a control parameter that indicates a specific mode of compressing the plurality of the subgroup parameters within the group in the encoded video data. The control parameter may correspond to controlling one group or a plurality of groups of pixels at the lower levels.

As illustrated above in the various embodiments of methods for syntax grouping, the different syntax grouping methods may have different data size efficiency depending on the nature of the various subgroup parameters intended for redundancy reduction. Thus, it may be necessary for the controller 350 to analyze the video data before encoding to determine and/or select an optimal method of syntax grouping for a specific set of subgroup parameters in a group. Additionally, the methods of syntax grouping may vary from one group of pixel to the next group of pixel. The video coder 330 may encode additional syntax information to signal to the video decoder which method of syntax grouping is used to code a specific group of pixels.

While the above examples illustrate scenarios of implementations for a group of pixels containing contiguous subgroups of pixels, the embodied syntax grouping may be implemented for non-contiguous groups of pixels or a group of non-contiguous subgroups of pixels.

Figure 4:
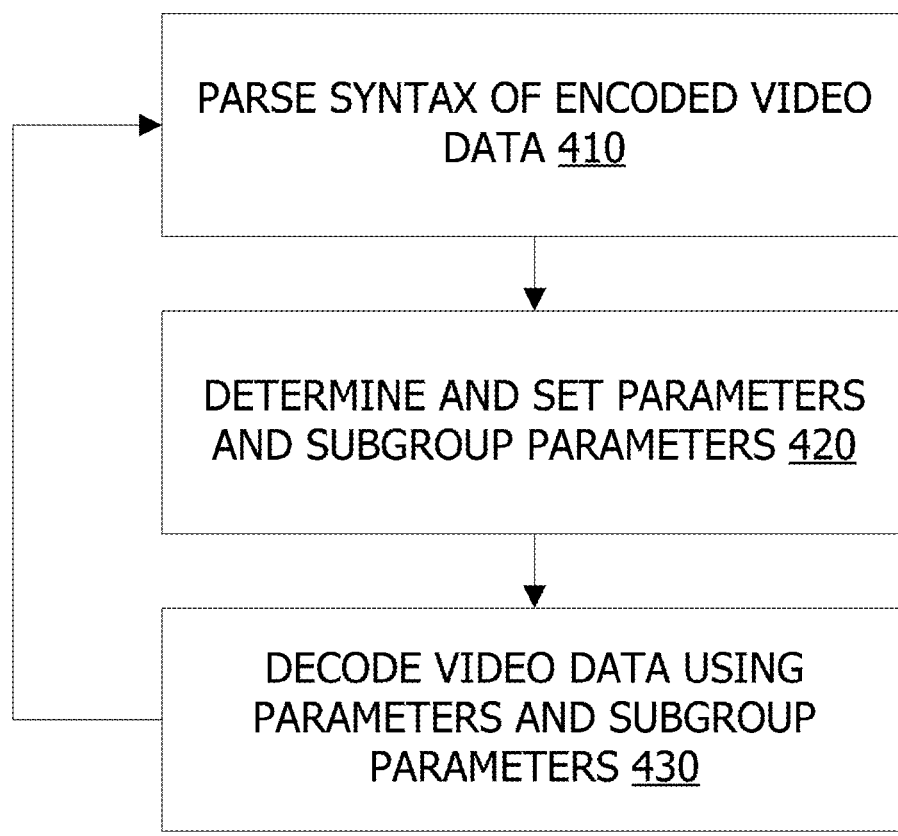
FIG. 4 illustrates a decoding method according to an embodiment of the present disclosure.

FIG. 4 illustrates a decoding method 400 according to an embodiment of the present disclosure.

At block 410, the system 200 may parse the syntax of the encoded video data.

At block 420, the controller 228 may determine, from the parsed syntax, parameters and set subgroup parameters to be used for decoding. Some subgroup parameters may be absent for specific subgroups and the controller 228 may determine these absent subgroup parameters by calculations based on other subgroup parameters and parameters of group the group, in accordance with specific syntax grouping methods.

At block 430, the controller 228 may control the video decoder 220 to decode video data using the set subgroup parameters. That is, some subgroups may not include corresponding subgroup parameters of specific types in the encoded video data. The absent subgroup parameters may be derived from other subgroup parameters and/or parameters of the group by the video decoder 220 or the controller 228 in accordance to the syntax grouping methods.

Figure 5:
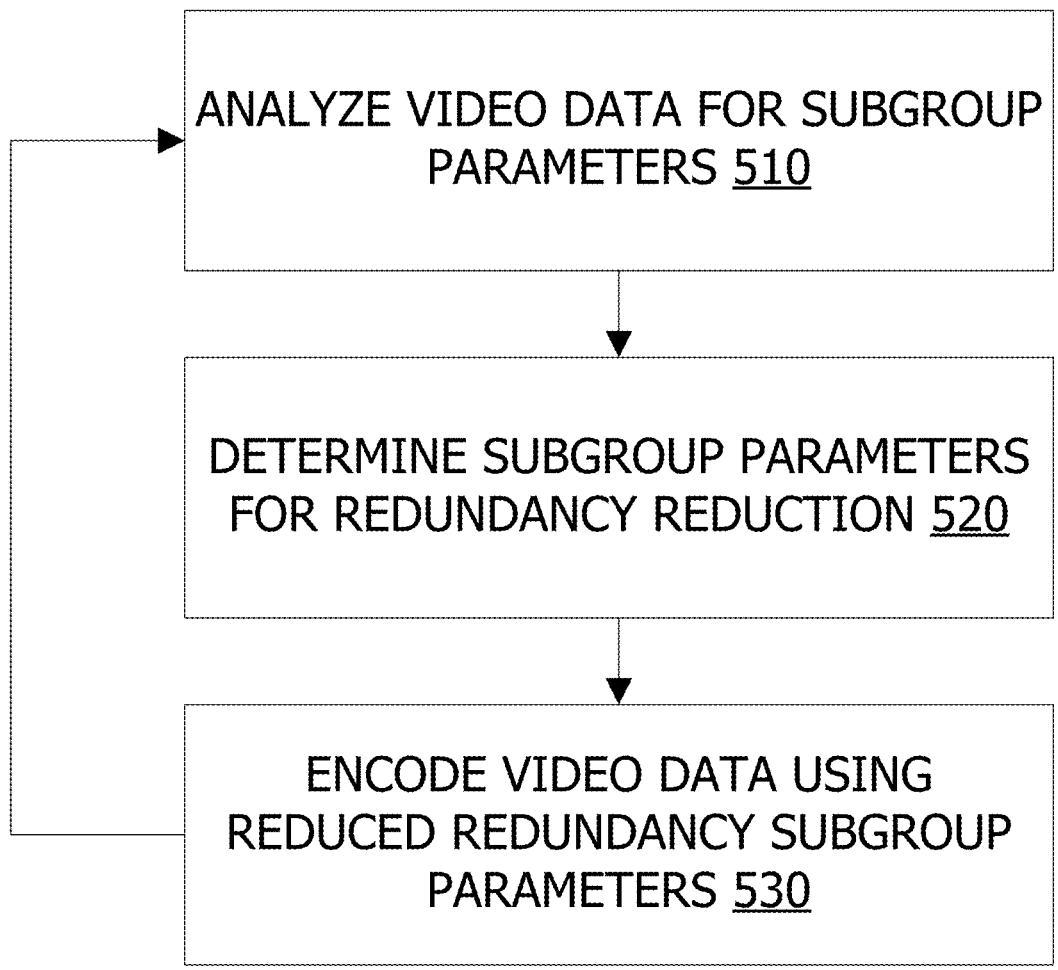
FIG. 5 illustrates a coding method according to an embodiment of the present disclosure.

FIG. 5 illustrates a coding method 500 according to an embodiment of the present disclosure.

At block 510, the system 300 may analyze the video image from the video source 310 for subgroup parameters for encoding of the subgroups of pixels.

At block 520, the controller 350 may determine if any subgroup parameters may be reduced for redundancy in encoding, according to predetermined syntax grouping methods. The controller 350 may also select the optimal syntax grouping method for specific types of subgroup parameters based upon the analysis of the subgroup parameters. The controller 350 may also set parameters for the group as part of the encoding of the group. The parameters for the group may or may not be included in the encoded video data, and may be derived from some of the subgroup parameters.

At block 530, the video coder 330 may encode video data using the reduced redundancy subgroup parameters. That is, some subgroups may not include corresponding subgroup parameters of specific types in the encoded video data. The absent subgroup parameters may be derived later from other subgroup parameters and/or parameters of the group by a video decoder in accordance to the syntax grouping methods.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed:

1. A system comprising:
    a receiver receiving encoded video data;
    a video decoder decoding the encoded video data organized as a plurality of groups of pixels of a frame, each group having a plurality of subgroups of pixels, the decoding using decoding parameters including a prediction mode derived respectively for the subgroups; and
    a controller that for at least one group of the plurality of groups:
        determines from the received encoded video data, a default prediction mode flag of the one group from a group-level syntax element, wherein the default prediction mode flag indicates a default prediction mode when true,
        when the default prediction mode flag is true, the prediction mode for every subgroup in the group is inferred to be the default prediction mod; and
        when the default prediction mode flag is false, the prediction mode for at least one subgroup is derived from a corresponding subgroup-level syntax element;
    wherein the video decoder decodes each subgroup of pixels according to its corresponding prediction mode.

2. The system of claim 1, wherein, when true, the default prediction mode flag indicates a constraint on the prediction mode for all subgroups to be an inter prediction mode.

3. The system of claim 1, wherein the at least one group of pixels corresponds to a coding tree unit and the subgroups of pixels correspond to a coding unit (CU).

4. The system of claim 1, wherein the subgroup-level syntax element from which prediction mode for the at least one subgroup is derived is included in the encoded bitstream only when the default prediction mode flag is false.

5. The system of claim 1, wherein the default prediction mode represents is an inter prediction mode, and the subgroup-level syntactic element in the encoded video data corresponding to the at least one subgroup includes at least one value indicating a prediction mode other than an inter prediction mode.

6. The system of claim 1, wherein the pixels of the subgroups of the at least one group are contiguous.

7. A system comprising:
    a video source of a video image;
    a video coder encoding the video image into encoded video data organized as a plurality of groups of pixels, each group having a plurality of subgroups of pixels, the encoding using coding parameters including a prediction mode derived respectively for the subgroups; and
    wherein a group-level syntax element in the encode video data for at least one group includes an all_inter flag indicating whether a prediction mode for all subgroups within the at least one group is an inter prediction mode, and
    when the all_inter flag is false for the at least one group, a subgroup-level syntax element in the encoded video data for at least one subgroup of the at least one group indicates a prediction mode for the at least one subgroup.

8. The system of claim 7, wherein the coding parameters are included in the encoded video data.

9. The system of claim 7, wherein the group is a Largest Coding Unit (LCU) and the subgroups are smaller Coding Units (CUs).

10. The system of claim 7, wherein the group comprises the plurality of the subgroups coded contiguously in the encoded video data.

11. The system of claim 7, wherein the default prediction mode represents an inter-coded partition mode, and the syntactic element in the encoded video data corresponding to the subgroup represents a different partition mode.

12. The system of claim 7, wherein, when true, the all_inter flag indicates a constraint on the prediction mode for all subgroups to be an inter prediction mode.

13. The system of claim 7, wherein the at least one group of pixels corresponds to a coding tree unit and the subgroups of pixels correspond to a coding unit (CU).

14. The system of claim 7, wherein the subgroup-level syntax element is included in the encoded bitstream only when the all_inter flag is false.

15. The system of claim 7, wherein the pixels of the subgroups of the at least one group are contiguous.

16. A method comprising:
    receiving, by a receiver, encoded video data;
    decoding, by a video decoder, the encoded video data organized as a plurality of groups of pixels of a frame, each group having a plurality of subgroups of pixels, the decoding using decoding parameters including a prediction mode derived respectively for subgroups;
    determining, by a controller, from the encoded video data, for at least one group of the plurality of groups, a default prediction mode flag from a group-level syntax element, wherein a true value for the default prediction mode flag indicates a default prediction mode;

when the default prediction mode flag is true, determining the prediction mode to be the default prediction mode for every subgroup in the group; and when the default prediction mode flag is false, determining the prediction mode for at least one subgroup from a corresponding subgroup-level syntax element;

wherein the video decoder decodes each subgroup of pixels according to its corresponding prediction mode.

17. The method of claim 16, wherein the default prediction mode represents an inter-coded partition mode, and the syntactic element in the encoded video data corresponding to the subgroup represents a different partition mode.

18. A method comprising:

encoding, by a video coder, a video image from a video source into encoded video data organized as a plurality of groups of pixels, each group having a plurality of subgroups of pixels, the encoding using coding parameters including a prediction mode derived respectively for the subgroups;

wherein a group-level syntax element in the encode video data for at least one group includes an all_inter flag indicating whether a prediction mode for all subgroups within the at least one group is an inter prediction mode, and when the all_inter flag is false for the at least one group, a subgroup-level syntax element in the encoded video data for at least one subgroup of the at least one group indicates a prediction mode for the at least one subgroup.

19. The method of claim 18, wherein the coding parameters are included in the encoded video data.

20. The method of claim 18, wherein the group is a Largest Coding Unit (LCU) and the subgroups are smaller Coding Units (CUs).

21. The method of claim 18, wherein the group comprises the plurality of the subgroups coded contiguously in the encoded video data.

22. The method of claim 18, wherein the video coder further encodes a control parameter that indicates whether all of the coding parameters within the group are encoded in the encoded video data.

23. The method of claim 18, wherein the video coder further encodes a control parameter that indicates a mode of compressing the coding parameters within the group in the encoded video data.

24. The method of claim 23, wherein the control parameter is encoded in at least one of Sequence Parameter Sets (SPS), Video Parameter Sets (VPS), Picture Parameter Sets (PPS), and slice header in the video image.

25. The method of claim 18, wherein the default parameter value represents an inter-coded partition mode, and the syntactic element in the encoded video data corresponding to the subgroup represents a different partition mode.

26. A method for video decoding, comprising:

receiving encoded video data organized as a plurality of groups of pixels in each frame, each group having a plurality of subgroups of pixels;

decoding the encoded video data, the decoding using decoding parameters including a prediction mode derived respectively for subgroups;

determining, from the encoded video data, for at least one group of the plurality of groups, a default prediction mode flag from a group-level syntax element, wherein a true value for the default prediction mode indicates a constraint on the prediction mode for subgroups of the at least one group;

when the default prediction mode flag is true, determining the prediction mode to be a default prediction mode for every subgroup in the group; and when the default prediction mode flag is false, determining the prediction mode for at least one subgroup from a corresponding subgroup-level syntax element.

* * * * *